Patented Aug. 27, 1940

2,213,119

UNITED STATES PATENT OFFICE 2,213,119

ARYLOXY-POLYALKYLENE ETHER IODIDES

Edgar C. Britton, Gerald H. Coleman, and John W. Zemba, Midland, Mich., assignors to The Dow Chemical Company, Midland, Mich., a corporation of Michigan No Drawing. Application March 1, 1940, Serial No. 321,802

11 Claims. (Cl. 260—613)

This invention relates to aryloxy-polyalkylene ether iodides and is particularly concerned with those compounds having the formula $$R\text{—}O\text{—}(C_nH_{2n}\text{—}O)_x\text{—}C_nH_{2n}\text{—}I$$

wherein R represents an aromatic radical, $n$ is an integer from 2 to 5, inclusive, and $x$ is an integer not greater than 4. These compounds are for the most part water-insoluble, substantially odorless, viscous liquids having high specific gravities. Some of the compounds tend to crystallize on standing. These iodo ether compounds are valuable as insecticidal toxicants, as modifiers for synthetic resins, and as intermediates in the preparation of more complex organic derivatives.

The aryloxy-polyalkylene ether iodides may be prepared by reacting an alkali metal iodide with an aryloxy-polyalkylene ether chloride or bromide. In carrying out this reaction, sodium or potassium iodide and the aryloxy-polyalkylene ether chloride or bromide are mixed together in an organic solvent such as methyl-ethyl ketone and the mixture heated to reaction temperature. Substantially equimolecular proportions of the alkali metal iodide and the chloro- or bromo-ether compound have been found to give the iodo ether derivative in good yield, although a small excess of inorganic iodide may be employed if desired. The particular solvent and the amounts thereof employed should be such as result in a boiling temperature not substantially below 75° C. and not above the decomposition temperature of the reaction mixture. While the reaction is conveniently carried out at the boiling temperature and under reflux, higher temperatures may be employed if desired, the reaction being carried out under autogenous pressure when temperatures above the boiling temperature of the reaction mixture prevail.

When the reaction is completed the sodium or potassium chloride or bromide which is formed as a by-product may be removed either by filtering the reaction mixture or by washing the mixture with water. The crude product is then fractionally distilled, whereby the desired iodo-ether derivative is obtained in substantially pure form. The preparation and properties of a number of chloro-ether compounds from which the corresponding iodo derivatives may be prepared are described in co-pending applications Serial Numbers 225,414, 225,415, and 225,416, filed August 17, 1938; and Serial Number 287,624, filed July 31, 1939.

The following examples set forth certain embodiments of the invention but are not to be construed as limiting the same.

Example 1

100 grams (0.5 mol) of beta-phenoxy-beta'-chloro-diethyl ether (boiling at 126°–128° C. at 4 millimeters pressure) and 75 grams (0.5 mol) of sodium iodide were dispersed in 500 milliliters of methyl-ethyl ketone and the mixture heated to its boiling temperature and under reflux for a period of 48 hours. The reaction mixture was then cooled to room temperature, filtered to remove the sodium chloride formed during the reaction, and the filtrate fractionally distilled under reduced pressure, whereby there was obtained 123 grams of beta-phenoxy-beta'-iodo-diethyl ether as a clear colorless oil boiling at 160°–162° C. at 6 millimeters pressure and having a specific gravity of 1.563 at 20°/4° C.

Example 2

A mixture of 79 grams (0.28 mol) of beta-(4-chloro-phenoxy)-beta'-(2-chloroethoxy)-diethyl ether (boiling at 184°–185° C. at 4 millimeters pressure), 50 grams (0.3 mol) of sodium iodide and 1 liter of methyl-ethyl ketone was heated to its boiling temperature and under reflux for a period of 96 hours. The reaction mixture was thereafter filtered to remove the sodium chloride and fractionally distilled, whereby there was obtained 83 grams of beta-(4-chlorophenoxy)-beta'-(2-iodoethoxy)-diethyl ether as a viscous colorless oil boiling at 185°–190° C. at 2 millimeters pressure and having the specific gravity 1.549 at 20°/4° C.

Example 3

In a similar manner 200 grams (0.69 mol) of beta-(2-phenoxy-ethoxy)-beta'-(2-chloroethoxy-)-diethyl ether boiling at 190°–196° C. at 3 millimeters pressure and 105 grams (0.69 mol) of sodium iodide were dispersed in 1 liter of methyl-ethyl ketone and the mixture heated to its boiling temperature and under reflux for 24 hours. The reaction mixture was thereafter filtered, washed with water, dried over anhydrous calcium sulphate, and heated on a steam bath for several hours to drive off the methyl-ethyl ketone. As a residue from the evaporation step, there was obtained a beta-(2-phenoxy-ethoxy)-beta'-(2-iodoethoxy)-diethyl ether product as a viscous, yellow-tinged oil substantially insoluble in water, somewhat soluble in many organic solvents, and which decomposed on attempted distillation.

In a similar manner sodium iodide or potassium iodide may be reacted with other aryloxy-polyalkylene ether chloride or bromides to obtain the corresponding organic iodides having the following general formulas

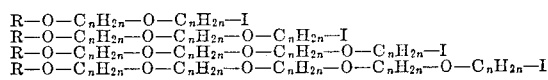

In the foregoing formulas, the group $$-O-C_nH_{2n}-$$

may represent such oxy-alkylene radicals as $$-O-CH_2-CH_2-$$

$$-O-CH_2-CH_2-CH_2-$$

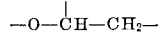

$$-O-CH_2-CH_2-CH_2-CH_2-$$

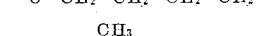

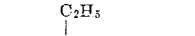

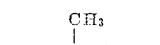

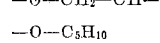

$$-O-C_5H_{10}$$

The aryl group R represents such aromatic radicals as those derived from phenol, naphthol, tetrahydro-naphthol, and nuclearly substituted analogues and homologues thereof containing one or more phenyl, chlorophenyl, methyl-phenyl, cyclopentyl, cyclohexyl, methyl-cyclohexyl, methyl, isopropyl, tertiarybutyl, tertiary-amyl, normal-hexyl, tertiaryoctyl, octadecanyl, benzyl, phenylethyl, 4-bromophenyl-propyl, phenyl-normal-hexyl, methoxy, tertiary-butoxy, carbethoxy, chlorine, bromine, iodine, and nitro radicals, and the like. These substituents may be attached to the aromatic nucleus in the ortho-, meta-, or para-position with respect to the hydroxyl grouping.

The following compounds are representative of the class of iodo ethers with which the invention is concerned:

Beta -(2.4.6-trichlorophenoxy) - beta'-iodo-diethyl ether boiling at 180°–185° C. at 2 millimeters pressure and having a specific gravity of 1.739 at 20°/4° C. This compound was prepared from the corresponding chloro-ether which boils at 182°–183° C. at 8 millimeters pressure and has the specific gravity 1.416 at 20°/4° C.

Beta-(4 - chlorophenoxy) - beta'-iodo-diethyl ether boiling at 175°–180° C. at 2 millimeters pressure and having a specific gravity of 1.627 at 20°/4° C. This compound was prepared from beta-(4-chloro - phenoxy) - beta'-chloro-diethyl ether which boils at 150°–155° C. at 2 millimeters pressure and has a freezing point at 23°–24° C.

Beta-(2-cyclohexyl - phenoxy)-beta' - iodo-diethyl ether boiling at 180°–185° C. at 2 millimeters pressure and having a specific gravity of 1.359 at 25°/25° C. This compound was prepared from the corresponding chloro-ether boiling at 170°–175° C. at 2 millimeters pressure and having the specific gravity 1.095 at 20°/4° C.

Beta - (4 - xenoxy) - beta' - iodo-diethyl ether melting at 79°–80° C. when crystallized from methyl-ethyl ketone. This compound was prepared from the corersponding chloro-ether boiling at 200°–205° C. at 5 millimeters pressure and melting at 50°–52° C.

Beta - (2.4.6 - trichloro-phenoxy) - beta'-iodo-diisopropyl ether boiling at 180°–185° C. at 4 millimeters pressure and having a specific gravity of 1.602 at 25°/25° C. This compound was prepared from the corresponding chloro-ether having a boiling point of 160°–163° C. at 3 millimeters pressure and a specific gravity of 1.325 at 25°/25° C.

Beta-(4 -toloxy) - beta'-(2 - iodo-ethoxy)-diethyl ether boiling at 195°–200° C. at 5 millimeters pressure and having a specific gravity 1.395 at 25°/25° C. This compound was prepared from the corresponding chloro-ether boiling at 182°–184° C. at 6 millimeters pressure and having a specific gravity of 1.098 at 20°/4° C.

This application is a continuation-in-part of our prior and co-pending application Serial Number 291,738, filed August 24, 1939.

Other modes of applying the principle of our invention may be employed instead of those explained, change being made as regards the products and method herein disclosed, provided the compounds or steps stated by any of the following claims or the equivalent of such stated compounds or steps be obtained or employed.

We therefore particularly point out and distinctly claim as our invention:

1. The process of preparing aryloxy-polyalkylene ether iodides which comprises the step of heating an alkali metal iodide with a compound of the formula $$R-O-(C_nH_{2n}-O)_x-C_nH_{2n}-Y$$

wherein R represents an aromatic radical, Y is a member of the group consisting of chlorine and bromine, n represents an integer from 2 to 5 inclusive, and x is an integer not greater than 4.

2. The process of preparing aryloxy-polyalkylene ether iodides which comprises the steps of dispersing an alkali metal iodide and a compound of the formula $$R-O-(C_nH_{2n}-O)_x-C_nH_{2n}-Y$$

wherein R represents an aromatic radical, Y represents a member of the group consisting of chlorine and bromine, n is an integer from 2 to 5, inclusive, and x is an integer not greater than 4, in methyl-ethyl ketone, and heating the mixture to its boiling temperature and under reflux.

3. A compound having the formula $$R-O-(C_nH_{2n}-O)_x-C_nH_{2n}-I$$

wherein R represents an aromatic radical, n is an integer from 2 to 5, inclusive, and x is an integer not greater than 4.

4. A compound having the formula $$R-O-(C_nH_{2n}-O)_x-C_nH_{2n}-I$$

wherein R represents an aromatic radical of the benzene series, n is an integer from 2 to 5, inclusive, and x is an integer not greater than 4.

5. A compound having the formula $$R-O-C_nH_{2n}-O-C_nH_{2n}-I$$

wherein R represents an aromatic radical and n is an integer from 2 to 5, inclusive.

6. A compound having the formula $$R{-}O{-}C_nH_{2n}{-}O{-}C_nH_{2n}{-}O{-}C_nH_{2n}{-}I$$

wherein R represents an aromatic radical and $n$ is an integer from 2 to 5, inclusive.

7. A compound having the formula $$R{-}O{-}(C_2H_4{-}O)_x{-}C_2H_4{-}I$$

wherein R represents an aromatic radical and $x$ is an integer not greater than 4.

8. A compound having the formula $$R{-}O{-}C_2H_4{-}O{-}C_2H_4{-}I$$

wherein R represents an aromatic radical of the benzene series.

9. A compound having the formula $$R{-}O{-}C_2H_4{-}O{-}C_2H_4{-}O{-}C_2H_4{-}I$$

wherein R represents an aromatic radical of the benzene series.

10. A compound having the formula

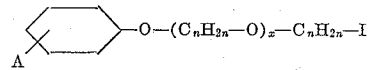

wherein A represents a hydrocarbon radical selected from the group consisting of alkyl, cycloalkyl, phenyl, and aralkyl, $n$ is an integer from 2 to 5, inclusive, and $x$ is an integer not greater than 4.

11. A compound having the formula

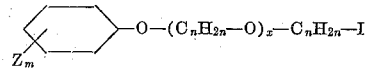

wherein Z represents halogen, $m$ represents an integer not greater than 5, $n$ represents an integer from 2 to 5, inclusive, and $x$ represents an integer not greater than 4.

EDGAR C. BRITTON.
GERALD H. COLEMAN.
JOHN W. ZEMBA.